United States Patent [19]

Plager

[11] 3,996,584

[45] Dec. 7, 1976

[54] DATA HANDLING SYSTEM HAVING A PLURALITY OF INTERRELATED CHARACTER GENERATORS

[75] Inventor: Malcolm Plager, Warren, N.J.

[73] Assignee: Burroughs Corporation, Detroit, Mich.

[22] Filed: Jan. 17, 1975

[21] Appl. No.: 541,979

Related U.S. Application Data

[63] Continuation-in-part of Ser. No. 352,067, April 16, 1973, abandoned.

[52] U.S. Cl. .................... 340/324 AD; 340/172.5

[51] Int. Cl.[2] .................... G06F 3/14

[58] Field of Search .................... 340/172.5, 324 AD

[56] References Cited

UNITED STATES PATENTS

| | | | |
|---|---|---|---|
| 3,555,520 | 1/1971 | Helbig et al. | 340/172.5 |
| 3,735,383 | 5/1973 | Naka | 340/324 A |
| 3,792,462 | 2/1975 | Casey et al. | 340/324 AD |
| 3,801,961 | 4/1974 | Coombe | 340/154 |

*Primary Examiner*—Gareth D. Shaw
*Assistant Examiner*—C. T. Bartz
*Attorney, Agent, or Firm*—Robert A. Green; William B. Penn

[57] ABSTRACT

The system includes at least two character generators, one for U.S. alphanumeric symbols, and the other for systems which use a majority of U.S. symbols, but each of which has a group of unique characters, also. A logic circuit steers the incoming data signals to one character generator or the other.

3 Claims, 11 Drawing Figures

TABLE OF INTERNATIONAL CODES
VARIABLES

| Code Table | 2/1 | 2/3 | 2/4 | 4/0 | 5/11 | 5/12 | 5/13 |
|---|---|---|---|---|---|---|---|
| 3 bit code | 000 | 001 | 010 | 011 | 110 | 101 | 100 |
| Spain | ! | Ps | $ | @ | [ | Ñ | ] |
| France | ! | # | Fr | @ | [ | \ | ] |
| U. Kingdom | ! | £ | $ | @ | [ | \ | ] |
| Germany | ! | # | $ | § | Ä | Ö | Ü |
| Italy | ! | # | $ | @ | [ | £ | ] |
| Portugal | ! | # | $ | @ | Õ | Ã | Ç |
| South Africa | ! | # | $ | @ | Ǹ | Ê | Ö |
| Sweden | ! | £ | $ | È | Ä | Ö | Å |
| Norway | ¦ | Æ | Å | Ø | [ | Ü | ] |

Fig. 1

STARTING LOCATIONS
IN CHARACTER GENERATOR 70

| Country | Location | Code |
|---|---|---|
| Spain | 0 | 000000 |
| France | 7 | 000111 |
| U. Kingdom | 14 | 001110 |
| Germany | 21 | 010101 |
| Italy | 28 | 011100 |
| Portugal | 35 | 100011 |
| South Africa | 42 | 101010 |
| Sweden | 49 | 110001 |
| Norway | 56 | 111000 |

Fig. 3

DATA HANDLING SYSTEM HAVING A PLURALITY OF INTERRELATED CHARACTER GENERATORS

CROSS-REFERENCE TO RELATED APPLICATION

This application is a continuation-in-part of Ser. No. 352,067, filed Apr. 16, 1973, now abandoned.

BACKGROUND OF THE INVENTION

A typical terminal for receiving digital signals representative of data information and for displaying this information visually, includes, among other things, a character generator for converting the data into a form which can be applied to a display device which then displays a character represented by the signals.

A manufacturer of terminals of this type normally manufactures a system which includes a single character generator for all terminals to be used in the United States. Up to now, for systems to be used in foreign countries, the manufacturer has provided a separate unique character generator for each country even though many countries have, in their machine language, many characters in common with the United States. This represents an undesirable expense and inventory problem where a relatively large number of countries is involved.

SUMMARY OF THE INVENTION

Briefly, a system embodying the invention includes a source of data signals and at least two character generators, one of which can generate signals representing a first group of characters, and the second of which can generate selected auxiliary characters to be used in conjunction with those generated by the first character generator.

DESCRIPTION OF THE DRAWINGS

FIG. 1 is a table showing selected countries and various unique characters for each, which can be processed according to the invention;

FIG. 3 is a table showing the codes and locations in a character generator for the countries for which the system of FIG. 2 is designed;

DESCRIPTION OF THE PREFERRED EMBODIMENTS

The principles of the invention are applicable to data processing and display systems usable in the United States and a number of other countries where the United States and each of the other countries has some alphanumeric symbols in common.

Figure 2:
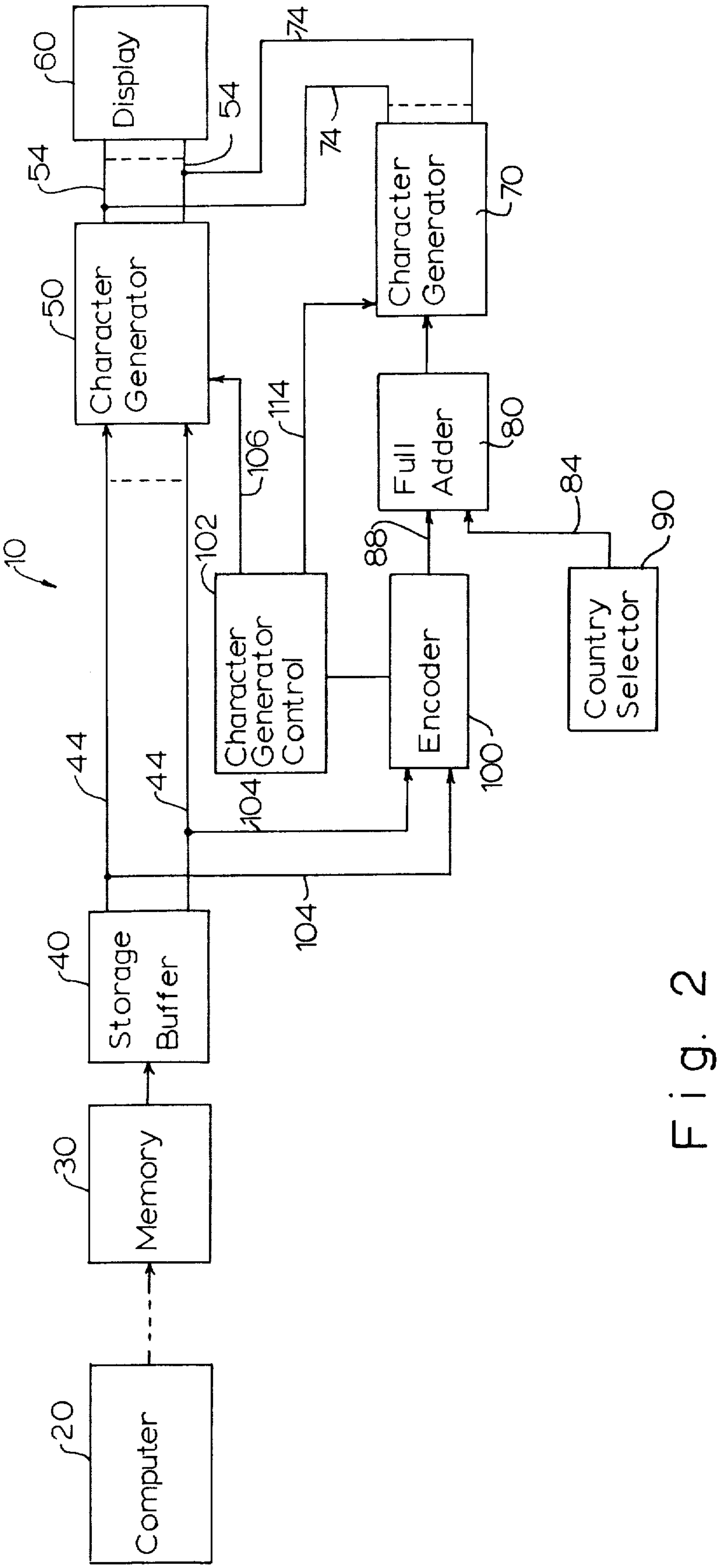
FIG. 2 is a schematic representation of a system embodying the invention.

For purposes of illustration, an alphanumeric display terminal 10, which is shown and described, is usable in the United States and in nine other countries, each of which uses a large number of alphanumeric characters which are used in the United States but also has seven unique alphanumeric characters of its own in the ASCII code table as illustrated in FIG. 1. Referring to FIG. 2, terminal 10 includes a source of information signals 20, which may utilize a computer or the like, coupled to the usual system elements including, among other things, a memory module 30 and a storage buffer 40.

According to the invention, the output of the storage buffer 40 is coupled on data lines 44 to a first character generator 50 which, in this case, is assumed to be able to generate signals for displaying characters, numerals and letters, normally used in the United States. The output of the character generator 50 is coupled on lines 54 to a display device 60 in which the characters are displayed. The device 60 may be, for example, a SELF-SCAN panel of the type manufactured and sold by Burroughs Corporation. Typically, six data lines 44 enter the character generator 50, and seven lines 54 appear at the output of the character generator and run to the display device 60.

According to the invention, the system 10 includes a second character generator 70 which includes a separate section for each of the nine countries identified above, and for generating output display signals for displaying, in the display device 60, seven unique characters for each such country. One suitable location and code arrangement for the nine countries is illustrated in the table of FIG. 3. Each of the sections of the character generator 70 is coupled to output leads 74 which are connected to the display device 60.

The character generator 70 is also provided with input circuitry for generating signals for accessing each of the nine code locations therein. The input circuit to the second character generator 70 includes data lines 104, from data lines 44 coming out of storage buffer 40, to the input of an encoder 100 which has output lines 88 connected to the input of a full adder 80. The full adder also has a circuit connection 84 to a logic circuit 90 which, in effect, provides a unique identifying code signal for each of the nine countries having a section in the character generator 70. The setting of logic circuit 90, for a particular country, is made by one or more jumpers connected in the circuit. Thus, the jumpers can be changed to set the logic for any country as desired. The encoder 100 also includes a control circuit portion 102 connected by leads 106 and 114 to the character generators 50 and 70 and operable to either enable the first character generator 50 and disable the second character generator 70 or vice versa.

In operation of the system 10 shown in FIG. 2, first let it be assumed that electrical information is fed from a source such as computer 20 to the memory 30 and then through the storage buffer 40 to the first character generator 50. Normally, the encoder is set so that character generator 50 is enabled and character generator 70 is disabled. Thus, if the incoming information includes only characters used in the United States and in the foreign country for which the system is designed, then the input information is fed into the first character generator 50 and output signals are provided which are displayed in the display device 60.

If, however, the incoming information represents one of the unique characters peculiar to the selected country, then this information is detected by the encoder 100 and operates control circuit 102 so that the character generator 50 is disabled and the second character generator 70 is enabled. Now, the input signals feed into the full adder 80, along with the selected country code from circuit 90, and these signals are added together by the full adder to provide an output which accesses the proper location in the second character generator 70 to provide at the output thereof the desired character signals unique to the selected country. This information is displayed in the display device 60.

Figure 4:
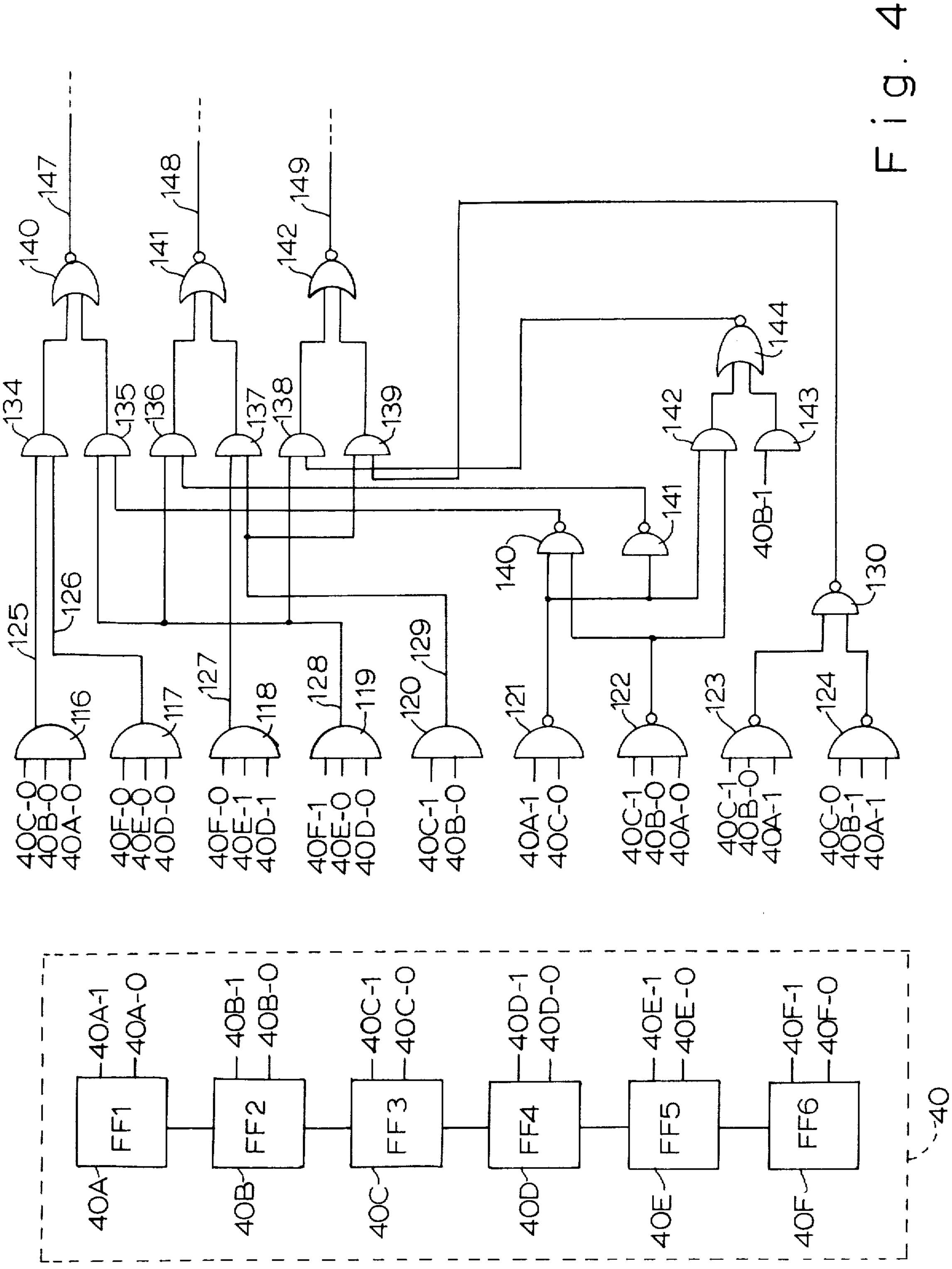
FIGS. 4 and 5 are a schematic representation of specific details of some of the elements of the system of FIG. 2.
Figure 5:
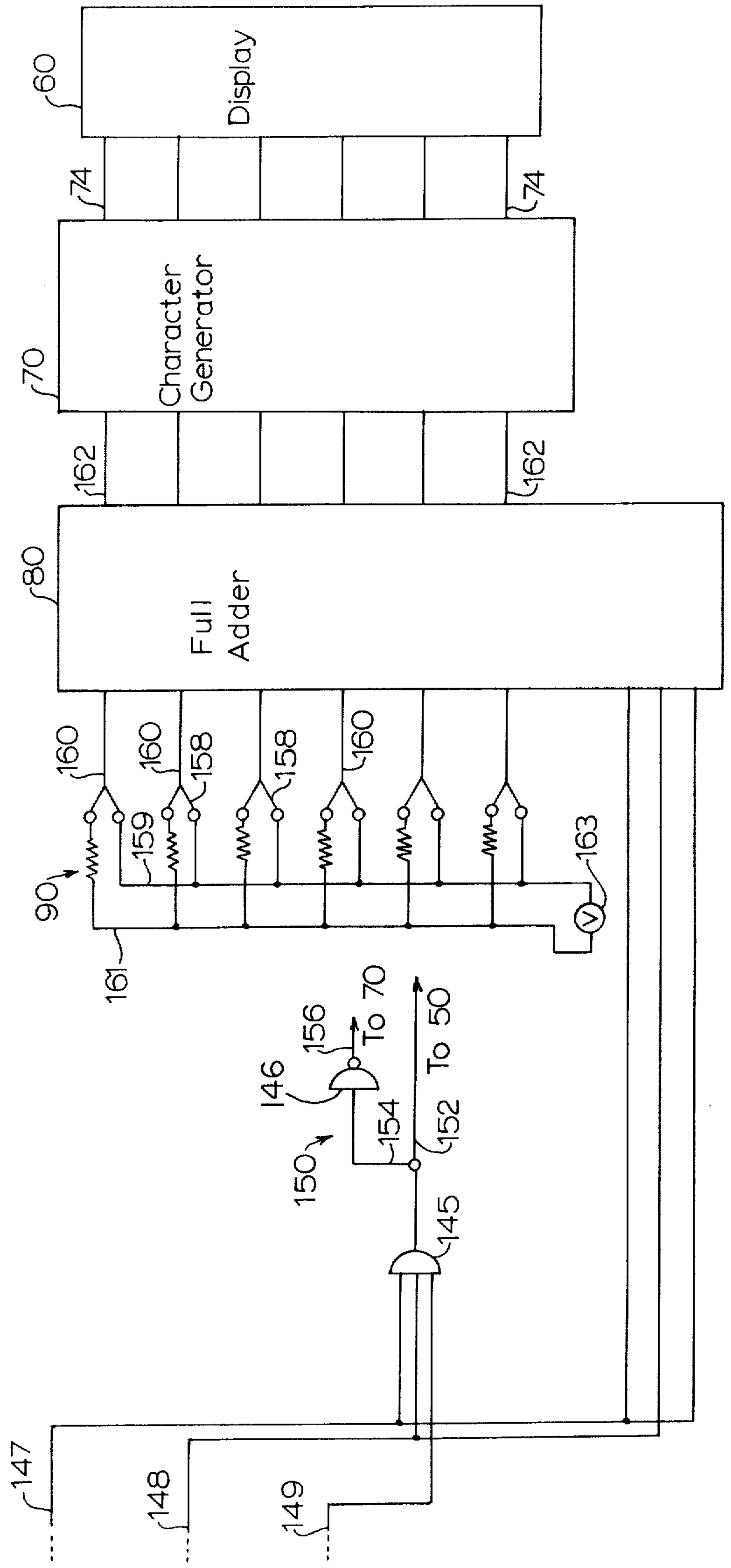

Some of the detailed circuit elements which may be used in the system of FIG. 2 are shown in FIGS. 4 and 5. In the system, the storage buffer comprises six flip-flops 40A, B, C, D, E, F having a total of twelve output lines which are fed into five AND gates 116 to 120 and four NAND gates 121 to 124. Each flip-flop 40 has an output line designated 1 and 0, with flip-flop 40A having output lines 40A-1 and 40A-0, flip-flop 40B having output lines 40B-1 and 40B-0, flip-flop 40C having output lines 40C-1 and 40C-0, etc.

The output leads from the storage buffer 40 are connected logically, as shown, to the AND gates 116 to 120 and NAND gates 121 to 124. The outputs of AND gates 116 to 120 and NAND gates 123 and 124 are logically coupled, as shown, to selected ones of AND gates 134 to 139, and the outputs of NAND gates 121 and 122 are logically coupled, as shown, through NAND gates 140 and 141 and AND gates 142 and 143 and NOR gate 144 to selected ones of AND gates 134 to 139. NAND gates 123 and 124 are connected through NAND gate 130 to AND gate 139.

The AND gates 134 to 139 are coupled into NOR gates 140, 141, and 142, as shown, and the outputs thereof provide data signals, on leads 147, 148, and 149, respectively, which are fed into the full adder 80. The leads 147, 148, and 149 (FIG. 5) are coupled into an OR gate 150 made up of AND gate 145 and NAND gate 146. The output of AND gate 145 is coupled by lead 154 to the input of NAND gate 146 and by lead 152 to the first character generator 50. The output of NAND gate 146 is coupled by lead 156 to the second character generator 70. The OR gate 150 thus is connected to the output circuitry of the character generators to enable and disable them as required.

The country-selecting logic 90, as shown in FIG. 5, comprises a plurality of jumper positions 158 in which jumpers can be selectively inserted to select the country for which the particular system is designed to operate. The jumper positions are connected by leads 159 and 161 to a source of potential 163 and to the full adder by leads 160. Six jumper positions are provided in this particular embodiment of the invention for nine foreign countries and their special codes. Each jumper or combination of jumpers sets the full adder to receive message information in the code of a particular country.

The output of the full adder 80 comprise six information lines 162 which form the input to character generator 70, and, as already described, the output of the character generator is coupled on seven data lines 74 to the display device 60.

With the logic circuitry described, if signals representing a symbol or symbols in the unique code of the country for which the circuit 90 is set are received on lines 40A to 40F at the output of the storage buffer, then the various gates assume such output polarity that the OR gate 150 enables character generator 70 and disables character generator 50, and the signal information passes through the full adder to the character generator and then to the display device 60 in which it is displayed.

Figure 6:
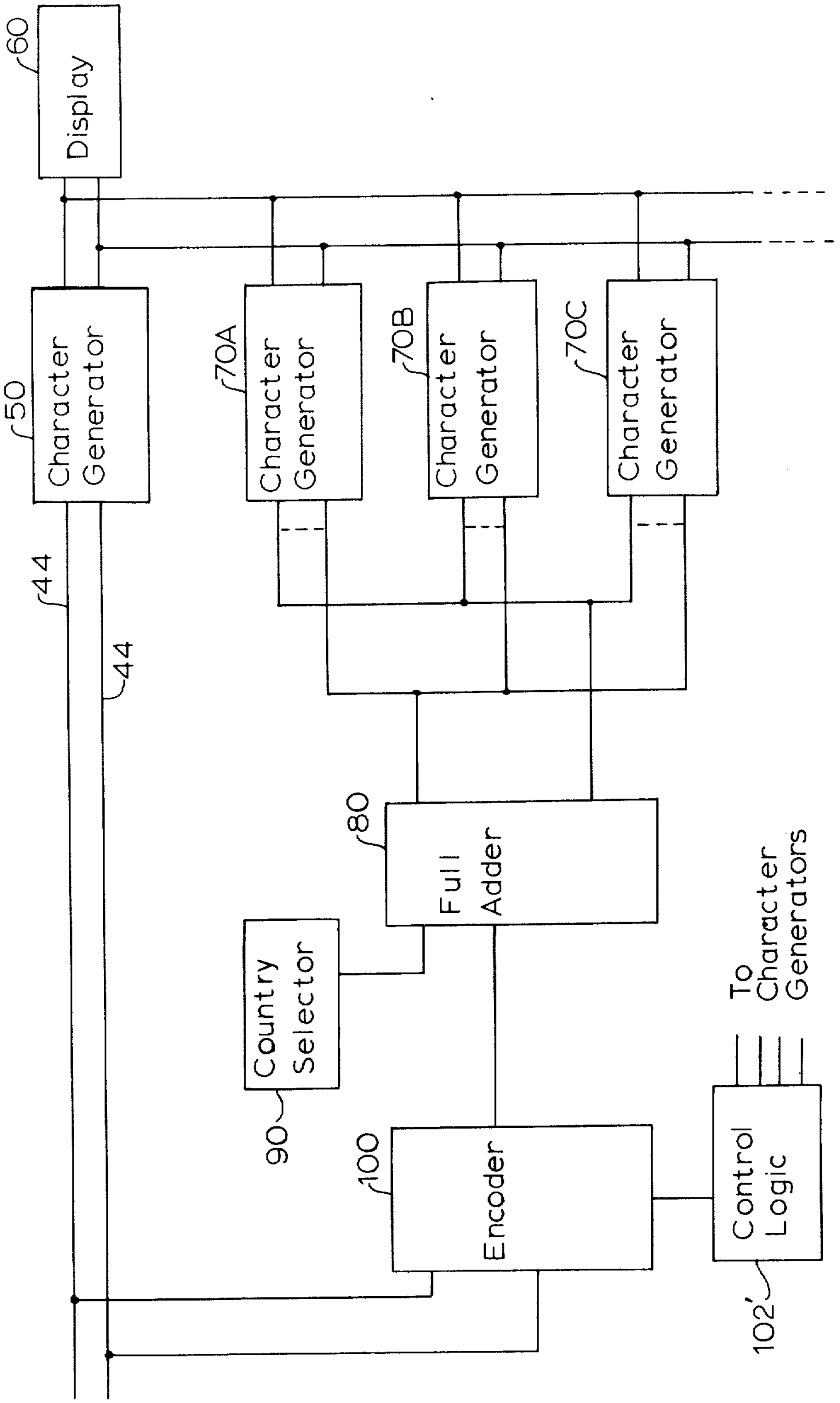
FIG. 6 is a schematic representation of another system embodying the invention.

As noted above, the principles of the invention may be utilized with more than nine countries other than the United States and more than one character generator 70. This more general aspect of the invention is illustrated in FIG. 6. The system shown therein includes a plurality of character generators 70A, B, C, . . . , including character codes for foreign countries, coupled in parallel to the output of the full adder 80.

The enable control portion 102' of the encoder 100 is coupled to all of the character generators 70, with the logic arrangement being such that one character generator is enabled and all of the others are disabled. The logic circuit 90 for feeding the code identification of the selected country into the full adder includes a plurality of code identification circuit elements, and the code for the selected country can be set by one or more removable jumpers. Thus, the logic circuit can be changed at any time, if desired.

Figure 7:
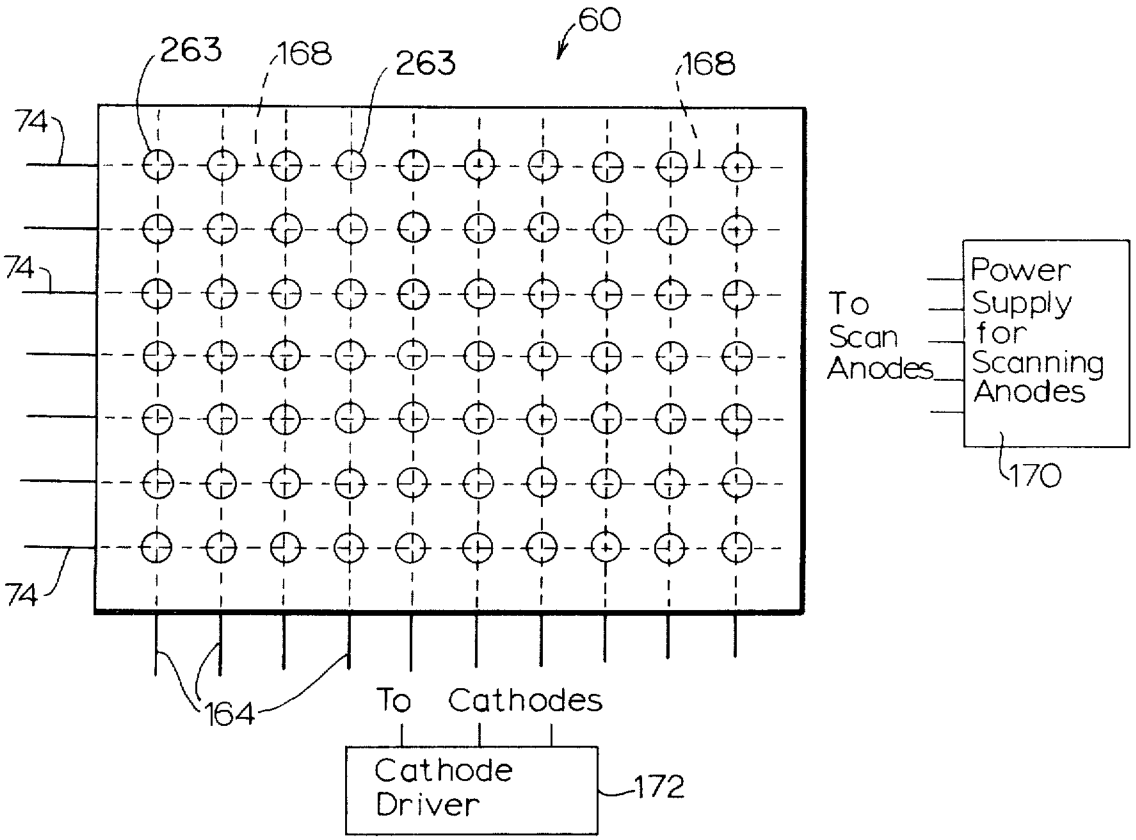
FIG. 7 is a schematic representation of one type of display device usable in the system of the invention.

A SELF-SCAN panel, as illustrated schematically in FIG. 7, is a dot matrix display device having a first layer of scanning cells (not shown) arrayed in rows and columns, with an anode electrode (not shown) aligned with each row of cells and a cathode electrode 164 aligned with each column of cells. The panel also includes a layer of display cells 263, each aligned with a scanning cell. The display cells 263 share the cathodes 164 and have their own row display anodes 168. The scanning cells are fired column-by-column by means of potentials applied to all of the scanning anodes at the same time from a power source 170 and to each of the cathodes 164 in turn from a drive circuit 172. Information signals, from one of the character generators, are applied to the display anodes on leads 74 to cause selected display cells to fire as the associated scanning cells are fired column-by-column. This operation is repeated cyclically at such a rate that stationary but changeable characters are displayed in the display cells.

Systems embodying the invention may also be used with other alphanumeric displays, such as cathode ray tube systems and the like.

Figure 8:
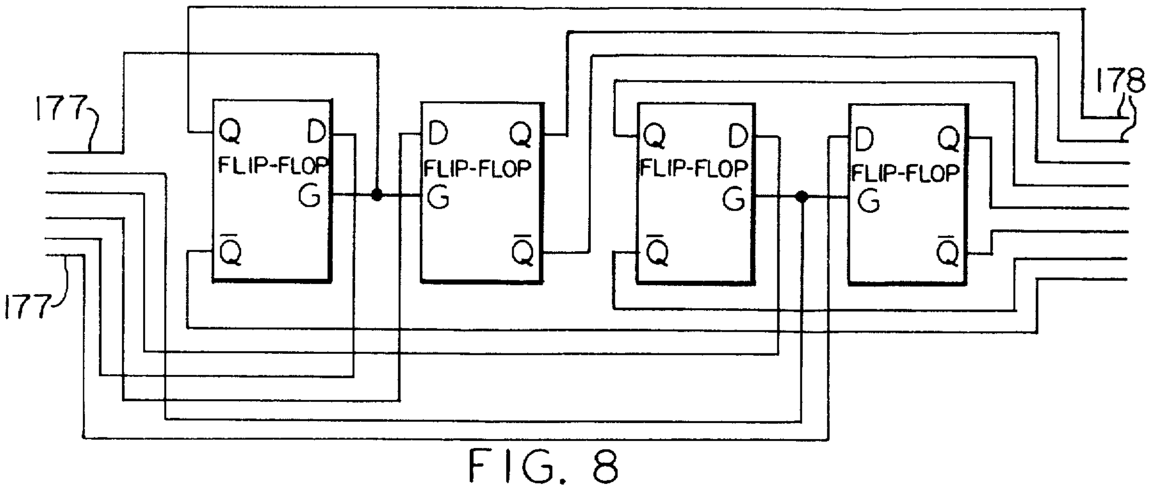
FIG. 8 is a block diagram representation of a buffer used in practicing the invention.
Figure 9:
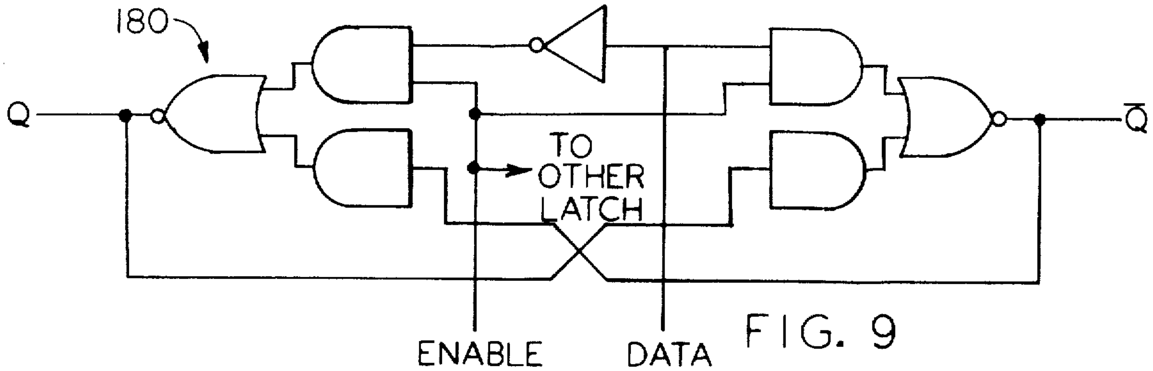
FIG. 9 is a detailed representation of one of the blocks of the buffer of FIG. 8.

To describe some of the portions of the system in greater detail, in one embodiment of the invention, the buffer 40 comprises one Texas Instruments' SN7475 chip connected with six data input lines and eight output lines. The block diagram representation of the buffer is shown in FIG. 8, and each block or latch 180 of the buffer shown in FIG. 8 is made up of logic circuitry of the type shown in FIG. 9.

The encoder 100 is shown in FIG. 4 and may be made up of TTL logic structures, with gates 116–120 being type SN7408, 121–130 being type SN7421, and gates 134–139 and 140–142 being type SN745l. An encoder module of the type generally under consideration is also illustrated in *Transistor-Transistor Logic*, Howard W. Sams Publication No. 20967, page 112.

Figure 10:
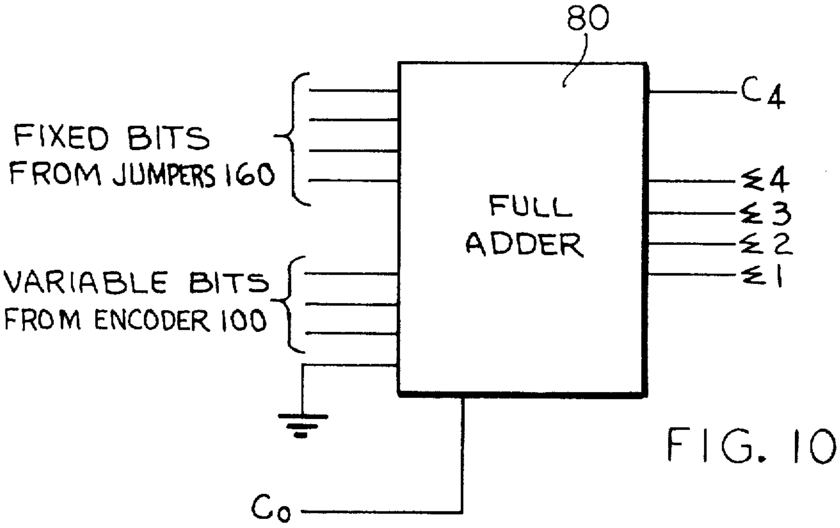
FIG. 10 is a block diagram representation of a full adder used in practicing the invention.

The full adder 80, illustrated schematically in FIG. 10, may be of the type SN7483 and is shown in the Texas Instruments *TTL Data Book for Design Engineers*, p. 199, and on pages 99 and 100 of the Howard W. Sams publication No. 20967 entitled *Transistor-Tansistor Logic*. As illustrated schematically in FIG. 10, the input of the full adder is variable information signals on three lines from the encoder 100 and fixed signal bits determined by the settings of the sector select switches 160 (FIG. 5) which set the inputs of various gates of the full adder at the logic levels, ground or a potential, required to steer the input signal words to the proper location in the character generator.

Figure 11:
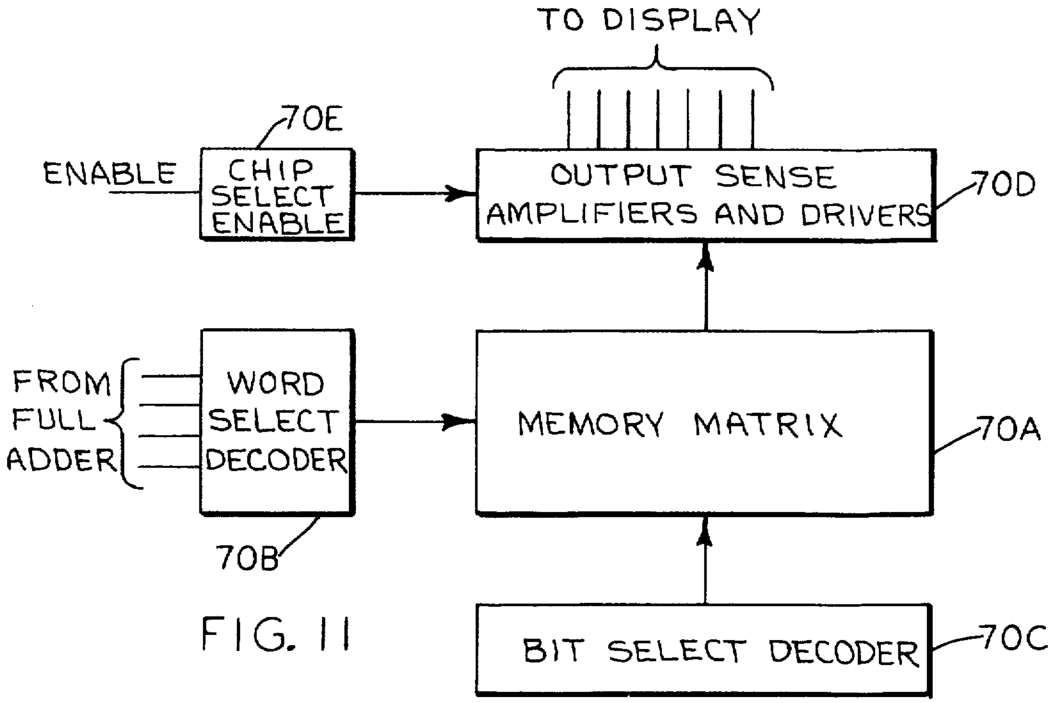
FIG. 11 is a block diagram representation of a character generator used in practicing the invention.

The character generator may be of the Mostek 2500 series which, as shown in FIG. 11, includes a memory matrix 70A, a word-select decoder 70B, a bit-select decoder 70C, output drivers 70D, and a chip-select 70E which is the enable or control circuit for the character generator. The memory matrix has its memory connected so that it forms nine sections or sectors, each of which can generate output signals for seven characters for each of nine countries, as shown in FIG. 3. The section of the character generator to which signals are steered by the word-select decoder 70B is determined by the jumper settings of the country selector circuit 90. In operation, the output of the word-select decoder is directed to a particular sector in the memory matrix 70A, and then a character is generated by the input signals as that sector of the memory is scanned under the control of the bit-select decoder 70C.

What is claimed is:

1. A data handling and displaying system comprising a display device for providing a visual display of characters, a source of data signals to be processed and displayed on said display device, said data signals including signals representing a first set of characters and other signals representing a plurality of different sets of characters, said source of data signals being coupled to a first circuit path including a first character generator having an input and an output, said first character generator being adapted to generate electrical display signals representative of a first set of characters, a connection from said source of data signals to the input of said first character generator, said first character generator having its output coupled to said display device for applying said first set of electrical display signals thereto, said source of data signals being coupled to a second circuit path including a second character generator having an input and an output, said second character generator being adapted to generate electrical display signals representative of a plurality of sets of characters different from said first set of characters, the output of said second character generator being coupled to said display device, a full adder having an input and an output, the output of said full adder being coupled to the input of said second character generator, an encoder having an input and an output, a selector circuit having an output, the output of said encoder and the output of said selector circuit being coupled to the input of said full adder, a connection from said source of data signals to the input of said encoder, a character generator control circuit, and a connection from said encoder to said character generator control circuit and separate connections from said character generator control circuit to said first and second character generators whereby, if said source of data signals provides signals representing said first set of characters, then said first character generator is enabled and, if said source of data signals provides signals representing one of said different sets of characters, then said second character generator is enabled.

2. The apparatus defined in claim 1 and including means coupled to the input of said full adder for causing said full adder to provide output signals representing one set of said different sets of characters.

3. The apparatus defined in claim 2 wherein said means includes switch means for setting the logic in said full adder to provide, at the output of said full adder, signals representing said one set of different characters.

* * * * *